(12) United States Patent
Schaedler et al.

(10) Patent No.: US 7,146,181 B2
(45) Date of Patent: Dec. 5, 2006

(54) METHODS AND SYSTEMS FOR DELIVERING PRESENCE INFORMATION REGARDING PUSH-TO-TALK SUBSCRIBERS

(75) Inventors: Richard Edward Schaedler, New Hill, NC (US); Larry Gene Slate, Cary, NC (US); Aziz A. Tejani, Morrisville, NC (US); Richard Nolan Kennedy, Jr., Naperville, IL (US)

(73) Assignee: Tekelec, Morrisville, NC (US)

( * ) Notice: Subject to any disclaimer, the term of this patent is extended or adjusted under 35 U.S.C. 154(b) by 196 days.

(21) Appl. No.: 10/798,924

(22) Filed: Mar. 11, 2004

(65) Prior Publication Data
US 2005/0202836 A1   Sep. 15, 2005

(51) Int. Cl.
*H04Q 7/20* (2006.01)
(52) U.S. Cl. .................... 455/466; 455/412.1
(58) Field of Classification Search ........... 455/412.1, 455/464, 466, 556.1, 550.1, 517–519, 414.1
See application file for complete search history.

(56) References Cited

U.S. PATENT DOCUMENTS

| | | | |
|---|---|---|---|
| 2002/0193127 A1* | 12/2002 | Martschitsch | 455/466 |
| 2003/0100326 A1* | 5/2003 | Grube et al. | 455/515 |
| 2003/0148779 A1* | 8/2003 | Aravamudan et al. | 455/519 |
| 2003/0235180 A1* | 12/2003 | Oprescu-Surcobe et al. | 370/348 |
| 2004/0047303 A1* | 3/2004 | Fernandez et al. | 370/293 |
| 2004/0125790 A1* | 7/2004 | Hiller et al. | 370/352 |
| 2005/0136952 A1* | 6/2005 | Zabawskyj et al. | 455/466 |
| 2005/0143111 A1* | 6/2005 | Fitzpatrick et al. | 455/518 |
| 2005/0143135 A1* | 6/2005 | Brems et al. | 455/564 |
| 2005/0164682 A1* | 7/2005 | Jenkins et al. | 455/412.1 |

\* cited by examiner

*Primary Examiner*—CongVan Tran
(74) *Attorney, Agent, or Firm*—Jenkins, Wilson, Taylor & Hunt, P.A.

(57) ABSTRACT

Methods and system for delivering presence information regarding push-to-talk subscribers are disclosed. In one method, a short message gateway receives presence information from a first push-to-talk subscriber from a presence or push-to-talk server. The short message gateway determines the location and availability of a second push-to-talk subscriber to which the presence information is directed. If the second push-to-talk subscriber is available, the SMS gateway delivers the presence information to the second push-to-talk subscriber in a manner that bypasses the SMSC. If the SMS gateway determines that the second push-to-talk subscriber is not available, the SMS gateway discards the presence information.

24 Claims, 4 Drawing Sheets

METHODS AND SYSTEMS FOR DELIVERING PRESENCE INFORMATION REGARDING PUSH-TO-TALK SUBSCRIBERS

TECHNICAL FIELD

The present invention includes methods and systems for delivering presence information. More particularly, the present invention relates to methods and systems for delivering presence information regarding push-to-talk subscribers.

BACKGROUND ART

Real time communications systems, such as push-to-talk communications systems, require that members of a talk group know the status and location of other members of a talk group. In order for such a communication system to work effectively, the information regarding each member's status and availability must be delivered to other members in real time. For example, if a subscriber activates his or her push-to-talk handset and becomes available, it is necessary to immediately distribute this information to all of the other users in the talk group.

One protocol that may be used to communicate subscriber status and location information among members of a talk group is the presence protocol. The presence protocol is described in IETF RFCs 2778 and 2779. According to the presence protocol, subscriber status information is stored in a database, referred to as a presence database. Other subscribers may subscribe to a first subscriber in the database. When the status of the first subscriber changes, the presence database sends notification messages to the other subscribers to notify the subscribers of the change in status. The other subscribers use this change in status to determine whether and where the first subscriber is available to receive communications.

One method for distributing presence protocol messages to mobile telecommunications network subscribers is to use short message service (SMS). SMS allows subscribers to send short text messages to each other via their mobile handsets. Subscribers can also send SMS messages to application servers, such as a presence, Push-to-Talk (PTT) or other server. SMS relies on short message service centers (SMSCs) to ensure that SMS messages are delivered. An SMSC stores SMS messages, locates destination subscribers, and forwards the SMS messages to the destination subscribers when they become available. SMSCs may reattempt delivery if a subscriber is initially unavailable.

One problem with using SMS to deliver presence information regarding push-to-talk subscribers is that presence information regarding push-to-talk subscribers loses its utility after a short time period. For example, if the intended recipient of an SMS message containing presence information regarding another subscriber is unavailable when the SMS message is initially generated, the SMSC stores the message and attempts re-delivery at a later time. Using the store and forward mechanism currently provided by SMSCs wastes SMSC resources if the intended recipient of the presence information is unavailable and introduces latency in delivering presence information when the intended recipient is available. Accordingly, there exists a need for improved methods and systems for delivering presence information regarding push-to-talk subscribers.

DISCLOSURE OF THE INVENTION

The present invention includes methods and systems for delivering presence information regarding push-to-talk subscribers in a manner that avoids latency introduced by short message service centers and that conserves short message service center resources. According to one method, an SMPP message is received at an SMS gateway. The SMS gateway determines whether the message contains presence information for real time delivery. If the message contains presence information for real time delivery and the subscriber is available, the message is delivered to the destination subscriber in a manner that bypasses the SMSC. If the subscriber is not available, the message may be discarded, since it loses its value after a short time period.

Accordingly, it is an object of the invention to provide methods and systems for delivering presence information regarding push-to-talk subscribers.

It is another object of the invention to provide improved methods and systems for delivering presence information regarding push-to-talk subscribers in a manner that bypasses SMSCs.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
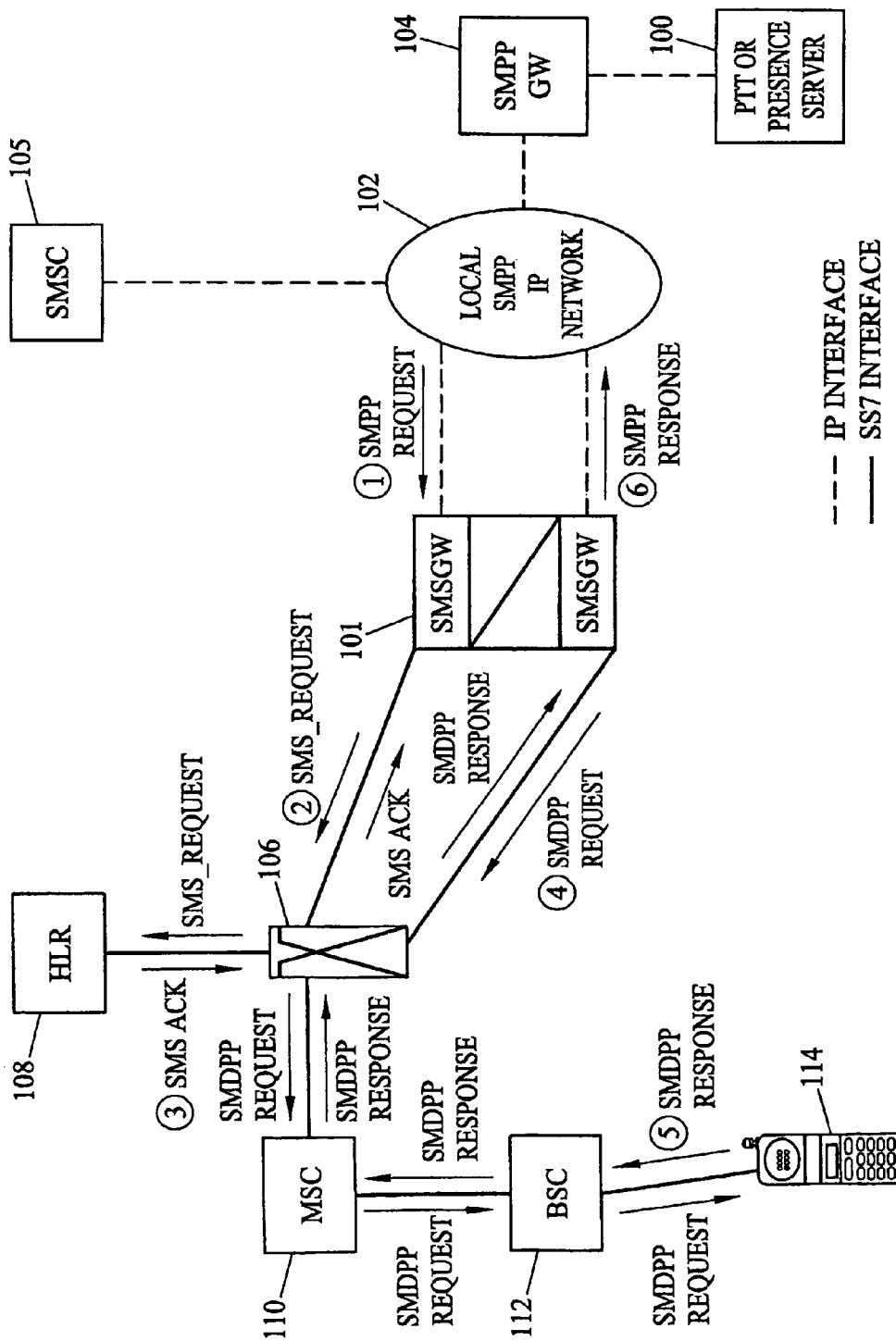
FIG. 1 is a network diagram illustrating an exemplary message flow for bypassing an SMSC in delivering presence information regarding a push-to-talk subscriber in an IS-41 network according to an embodiment of the present invention.

As stated above, the present invention delivers presence information regarding to push-to-talk subscribers in a manner that bypasses the SMSC and thus avoids latency and wasting of SMSC resources. FIG. 1 is a network diagram illustrating an exemplary method for delivering presence information regarding a push-to-talk subscriber according to an embodiment of the present invention. Referring to FIG. 1, a communications network may include a push-to-talk or presence server 100 that stores and maintains presence information regarding push-to-talk subscribers. An SMS gateway 101 provides an interface between local Short Message Peer-to-Peer (SMPP) network 102 of push-to-talk or presence server 100 and an SS7 network. Local SMPP network 102 may also include SMPP gateway 104 for sending and receiving SMPP messages and an SMSC 105 for delivering non-presence-based SMS messages. A signal transfer point 106 routes SS7 messages between SS7 network entities, such as HLR 108, MSC 110, and BSC 112, and SMS gateway 101.

Although in the example illustrated in FIG. 1, presence server 100 is connected to network 102 via SMPP gateway 104, the present invention is not limited to such a configuration. In an alternate configuration, presence server 100 may be directly connected to network 102 without going through an SMPP gateway. The same applies for the example described below with regard to FIG. 2.

In the illustrated example, when presence status regarding a push-to-talk subscriber changes, push-to-talk or presence server 100 sends the updated information to SMPP gateway 104. SMPP gateway 104 formulates an SMPP request message including the presence information. The SMPP request message is forwarded to SMS gateway 101 via local SMPP IP network 102. In response to the SMPP request message, SMS gateway 101 formulates an SMS request message with a TCAP origination transaction ID that identifies SMS gateway 101 and forwards the message to STP 106. STP 106 performs a lookup based on the MSISDN number in the SMS request message and forwards the SMS request message to the appropriate HLR 108. HLR 108 determines the location of the destination subscriber 114 and formulates an SMS acknowledgement message containing the location information, including the ID of MSC 110 in which subscriber 114 is currently available. The SMS acknowledgement message may also include a transaction identifier for identifying the SMS transaction. HLR 108 forwards the acknowledgement message via STP 106 to SMS gateway 101.

In response to receiving the SMS acknowledgment message including the MSC and destination transaction IDs, SMS gateway 101 formulates an SMS Delivery Point-to-Point (SMDPP) request message for sending the presence information to the subscriber. SMS gateway 101 forwards the SMDPP request message to MSC 110. MSC 110 sends the request message to BSC 112. BSC 112 forwards the SMDPP request message to handset 114 to deliver the presence information to the handset. In response to the SMDPP request, handset 114 sends an SMDPP response with the TCAP destination transaction ID set to identify SMS gateway 101. Thus, using the steps illustrated in FIG. 1, presence information regarding a push-to-talk subscriber can be delivered using SMS in a manner that by passes the SMSC.

Figure 2:
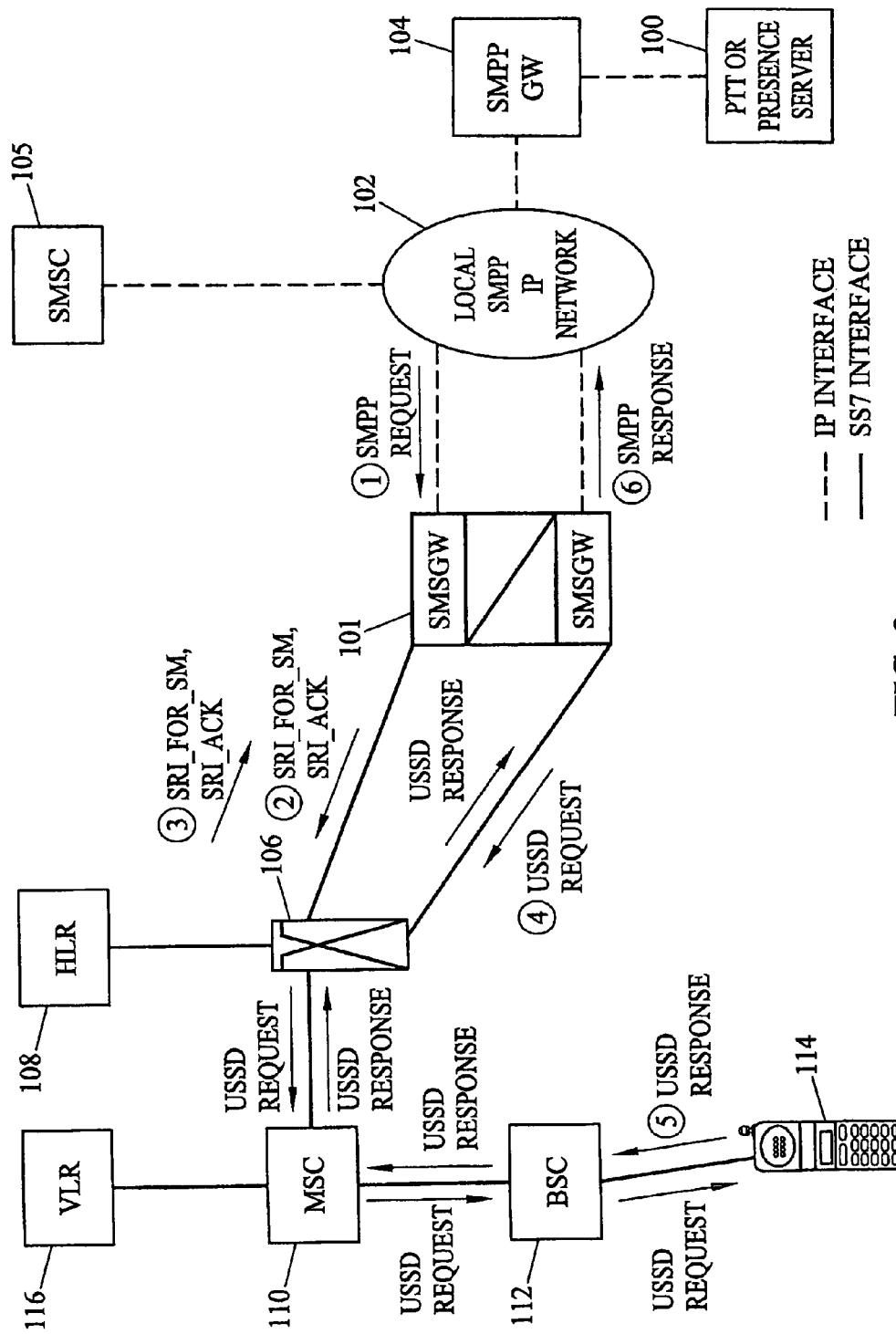
FIG. 2 is a network diagram illustrating an exemplary message flow for delivering presence information regarding a push-to-talk subscriber in a GSM network according to an embodiment of the present invention.

In addition to delivering presence information to subscribers using SMS messages, SMS gateway 101 may also deliver presence information using alternate message protocols, such as the unstructured supplementary services data (USSD) protocol. FIG. 2 is a network diagram illustrating an exemplary message flow for delivering presence information to handset 114 using the USSD protocol. In FIG. 2, SMS gateway 101 may determine the USSD compatibility of handset 114 by intercepting messages exchanged between HLR 108 and VLR 116 when subscriber handset 114 changes locations. Such message interception may be performed by message copy and MAP screening functions within STP 106 or by a signaling link probe external to STP 106. Alternatively, SMS gateway 101 may be provisioned with data that indicates the USSD capabilities of mobile handsets.

In order to deliver presence information to handset 114, PTT or presence server 100 generates presence information and forwards the presence information to SMPP gateway 104. SMPP gateway 104 formulates an SMPP request message including the presence information and sends the SMPP request message to SMS gateway 101. SMS gateway 101 determines that the subscriber is USSD compatible and available. Accordingly, SMS gateway 101 sends an SRI_for_short_message message to STP 106. STP 106 performs a lookup based on the MSISDN number in the SRI message and determines that the message is destined for HLR 108. Accordingly, STP 106 forwards the SRI message to HLR 108. HLR 108 sends a response containing the MSC and destination transaction ID to SMS gateway 101 via STP 106.

In response to receiving the MSC information, SMS gateway 101 formulates a USSD request with a TCAP origination transaction that identifies SMS gateway 101 and forwards the USSD request to MSC 110 via STP 106. MSC 110 sends the USSD request to handset 114 via BSC 112. Handset 114 formulates a USSD response and sends the USSD response to SMS gateway 101 via BSC 112, MSC 110, and STP 106. The TCAP destination transaction ID in the response is set to identify SMS gateway 101. SMS gateway 101 terminates the USSD response. SMS gateway 101 then sends and SMPP response back to PTT or presence server 100.

Figure 3:
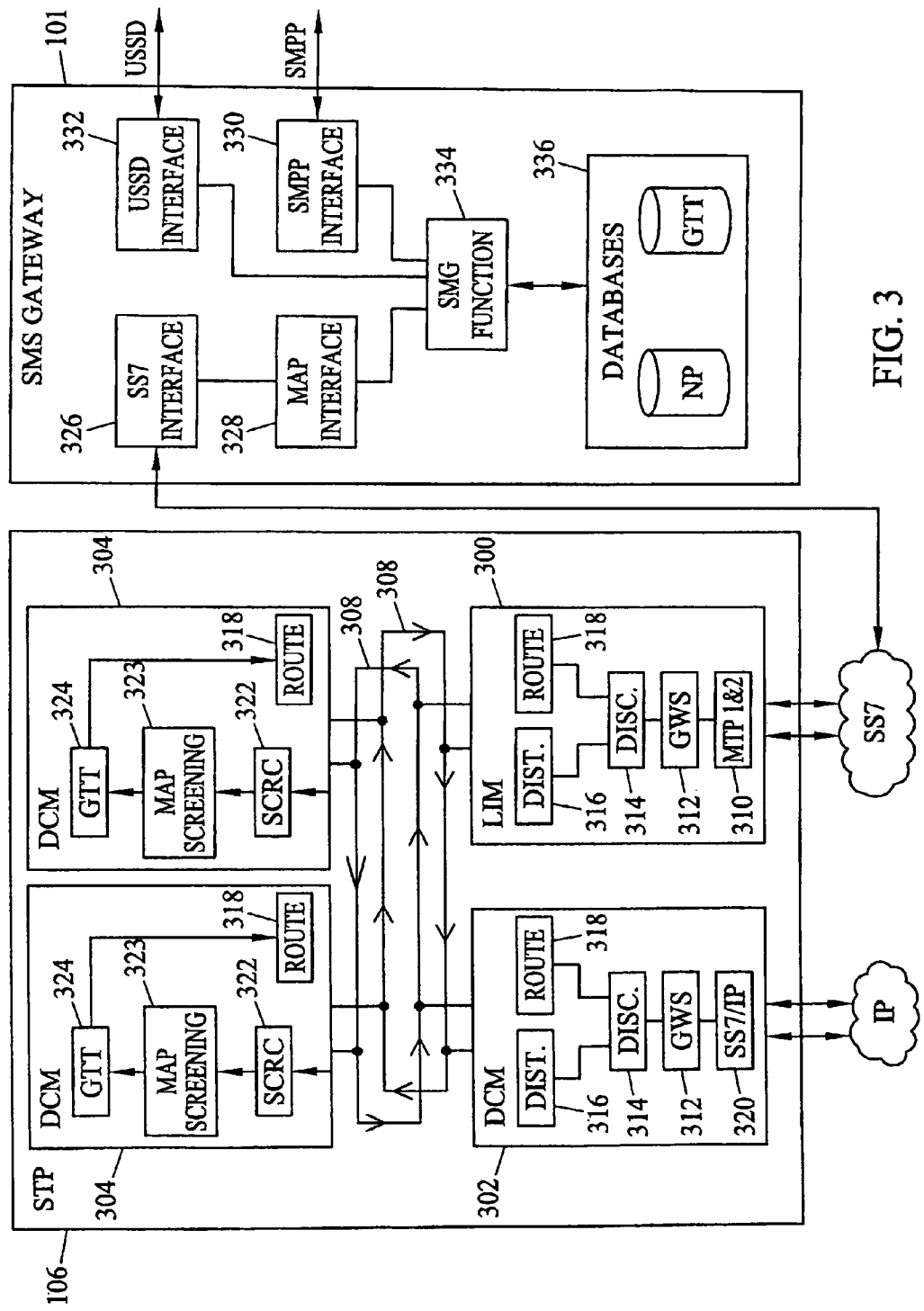
FIG. 3 is a block diagram illustrating an exemplary SMS gateway and a signal transfer point suitable for implementing the presence message delivery methods according to an embodiment of the present invention.

FIG. 3 is a block diagram illustrating an exemplary STP 106 and SMS gateway 101 suitable for implementing presence information delivery according to an embodiment of the present invention. Referring to FIG. 3, STP 106 includes a distributed internal processing architecture in which a plurality of modules or processor cards are connected to each other and communicate via a counter-rotating, dual-ring bus. In the illustrated example, the modules or processor card include an SS7 link interface module (LIM) 300, a data communications module (DCM) 302, and database services modules (DSMs) 304. Modules 300, 302, and 304 are connected via buses 308. In an alternate configuration, modules 300, 302, and 304 may be connected via a switch, such as an Ethernet switch.

Link interface module 300 includes functionality for sending and receiving messages over an SS7 network. In the illustrated example, link interface module 300 includes a message transfer part (MTP) layer 1 and 2 function 310, a gateway screening function 312, a discrimination function 314, a distribution function 316, and a routing function 318. MTP level 1 and 2 function 310 performs SS7 MTP level 1 and 2 operations, such as error detection, error correction, and sequencing. Gateway screening function 312 screens messages to determine whether to allow the messages into the network managed by signal transfer point 106. The screening may be performed based on the destination point code or any other MTP 3 layer parameters in the message. Discrimination function 314 examines the destination point code in a message to determine whether the message is addressed to STP 106 or to an external node. If the message is addressed to STP 106, discrimination function 314 passes the message to distribution function 316. Distribution function 316 distributes the message to one of the other processing modules in STP 106 via buses 308. If the message is destined for an external node, discrimination function 314 passes the message to routing function 318. Routing function 318 performs MTP 3 routing based on the destination point code in the message. Once routing function 318 locates the outbound linkset associated with the destination point code, routing function 318 routes the message to the card or module associated with the outbound signaling link via bus 308.

DCM 302 includes functionality for sending and receiving SS7 messages over IP networks. In the illustrated example, DCM 302 includes an SS7/IP gateway function 320, a gateway screening function 312, a discrimination function 314, a distribution function 316, and a routing function 318. SS7/IP gateway function 320 performs the operations necessary to send and receive SS7 messages over IP networks. For example, SS7/IP gateway function 320 may implement TCP/IP, SCTP/IP, or UDP/IP as the underlying transport and network layers. In addition, SS7/IP gateway function may implement one or more SS7 adaptation layers, such as M3UA, SUA, M2PA, or Tekelec's Transport Adapter Layer Interface, to carry SS7 traffic. Gateway screening function 312, discrimination function 314, distribution function 316, and routing function 318 perform the same functions as the correspondingly numbered components described with regard to LIM 300.

Database services module 304 include functions for performing database services for SS7 messages identified as requiring internal processing by signal transfer point 106. In the illustrated example, each database services module includes a signaling connection routing controller 322, a MAP screening function 323, a global title translation function 324, and a routing function 318. Signaling connection routing controller 322 receives signaling connection control part (SCCP) messages sent from LIM 300 or DCM 302 via bus 308 and determines the type of SCCP processing that should be performed for the messages. One type of SCCP processing that may be performed is global title translation. Accordingly, SCRC 322 may call or invoke global title translation function 324 to perform global title translation for SCCP messages that are sent route on global title. After global title translation is performed, global title translation function 324 may forward the messages to routing function 318, where the messages are routed to the interface module associated with the outbound signaling link. MAP screening function 323 may screen and copy MAP messages relating to changes in location of mobile subscribers and forward copies of these messages to SMS gateway 101. SMS gateway 101 may utilize information extracted from these messages to determine whether subscribers are USSD-capable.

SMS gateway 101 may be connected to signal transfer point 106 via SS7 signaling links, IP signaling links, or a direction connection to bus 308. In the illustrated example, SMS gateway 101 is connected to STP 106 via SS7 signaling links. However, any suitable method for interconnecting STP 106 and SMS gateway 101 is intended to be within the scope of the invention.

SMS gateway 101 includes functionality for sending and receiving SMPP messages, SS7 messages, and USSD messages relating to the delivery of presence information. For example, SMS gateway 101 may include an SS7 interface 326, a MAP interface 328, an SMPP interface 330, a USSD interface 332, a short message gateway function 334 and databases 336. SS7 interface 326 implements SS7 MTP layers 1–3 for communicating with STP 106 via SS7 signaling links. MAP interface 328 terminates MAP protocol messages relating to SMS. SMPP interface 330 terminates SMPP messages relating to the delivery of short messages. USSD interface 332 implements the USSD protocol to send and receive messages to mobile handsets without using SMS. Short message gateway function 334 controls the overall operation of SMS gateway 101. In addition, short message gateway function 334 may perform lookups in one or more databases 336 in order to properly route SMS control messages.

Figure 4:
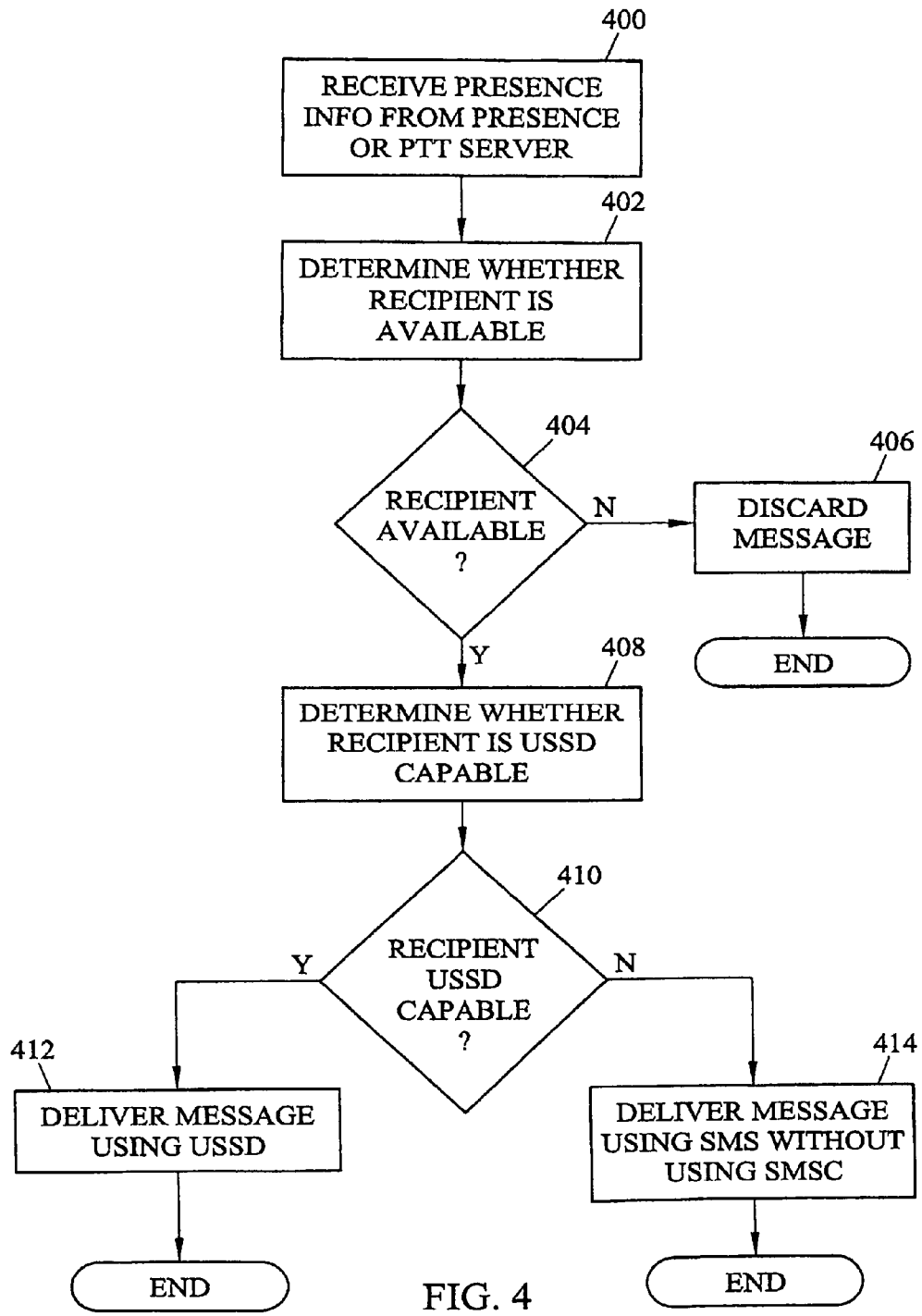
FIG. 4 is a flow chart illustrating exemplary steps performed by the SMS gateway in FIG. 3 in delivering presence information regarding push-to-talk subscribers according to an embodiment of the present invention.

Short message gateway function 334 may perform the operations described above for delivering presence information to mobile subscribers in a manner that bypasses the SMSC. FIG. 4 is a flow chart that illustrates exemplary steps that may be performed by short message gateway function 334 in delivering presence information relating to push-to-talk subscribers. Referring to FIG. 4, in step 400, short message gateway function 334 receives presence information from a presence or push-to-talk server. In step 402, short message gateway function 334 determines whether the intended recipient is available. This step may be performed by querying the HLR as illustrated in FIGS. 1 and 2. If the subscriber is not available, control proceeds to step 406 where the message is discarded. In addition to or instead of discarding the message, short message gateway function 334 may send a notification to the presence or push-to-talk server indicating that the intended recipient is unavailable.

In conventional SMS delivery methods, the short message intended for a mobile subscriber would be stored until the subscriber became available. This is undesirable for SMS-based presence messages regarding push-to-talk subscribers, since presence information regarding push-to-talk subscribers loses its utility for contacting a subscriber after a short time period. The present invention avoids this difficulty by only attempting to deliver messages if the intended recipient is available, thereby avoiding latency and unnecessary wasting of SMSC resources.

In step 404, if the recipient is available, control proceeds to step 408 where short message gateway function 334 determines whether the recipient is USSD-capable. Determining whether the recipient is USSD-capable may include intercepting messages passed between HLR 108 and VLR 116 to determine whether the recipient handset has USSD capabilities. Alternatively, SMS gateway 101 may be provisioned with information as to whether subscribers are USSD-capable. In step 410, if the recipient handset is USSD-capable, control proceeds to step 412 where the message is delivered using USSD. Delivering the message using USSD bypasses the SMSC, since USSD is session oriented, rather than store and forward oriented.

In step 410, if the recipient is not USSD-capable, control proceeds to step 414 where the message is delivered using SMS in a manner that bypasses the SMSC. For example, as illustrated in FIG. 1, the short message gateway may determine the location of the recipient and send the presence information directly to the recipient.

Thus, the present invention includes methods and systems for delivering presence information regarding push-to-talk subscribers. The messages are delivered in a manner that avoids the store and forward mechanism of conventional SMS message delivery. Using a short message gateway, the present invention bypasses SMSCs and allows messages to be delivered directly to the subscriber. Accordingly, latency and wasting of SMSC resources are reduced.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for delivering presence information regarding push-to-talk subscribers, the method comprising:
   (a) receiving, from push-to-talk or presence server, presence information regarding a first push-to-talk subscriber, the presence information being destined for a second push-to-talk subscriber;

(b) determining whether the second push-to-talk subscriber is available; and (c) in response to determining that the second push-to-talk subscriber is available, delivering, using a short message service message, the presence information to the second push-to-talk subscriber in a manner that bypasses a short message service center (SMSC) and a store and forward mechanism of SMS delivery implemented by the SMSC.

2. The method of claim 1 wherein receiving presence information includes receiving a short message peer-to-peer (SMPP) message containing the presence information.

3. The method of claim 1 wherein determining whether the second push-to-talk subscriber is available includes formulating a query to a home location register (HLR).

4. The method of claim 1 wherein delivering the presence information to the second push-to-talk subscriber in a manner that bypasses the SMSC includes determining the location of the second mobile subscriber and delivering the presence information via an SMS message to the second push-to-talk subscriber without sending the SMS message through the SMSC.

5. The method of claim 1 comprising, in response to determining that the second push-to-talk subscriber is unavailable, discarding the presence information.

6. The method of claim 1 comprising, in response to determining that the second push-to-talk subscriber is unavailable, notifying the presence or SMPP server that the second mobile subscriber is unavailable.

7. A method for delivering presence information regarding push-to-talk subscribers, the method comprising:

(a) receiving, from a push-to-talk or presence server, presence information regarding a first push-to-talk subscriber, the presence information being destined for a second push-to-talk subscriber;

(b) determining whether the second push-to-talk subscriber is available; and (c) in response to determining that the second push-to-talk subscriber is available, delivering the presence information to the second push-to-talk subscriber in a manner that bypasses a short message service center (SMSC), wherein delivering the presence information includes determining whether the second push-to-talk subscriber is unstructured supplementary services data (USSD)-capable, and in response to determining that the second push-to-talk subscriber is USSD-capable, delivering the presence information to the second push-to-talk subscriber using USSD.

8. The method of claim 7 wherein delivering the presence information to the second push-to-talk subscriber includes in response to determining that the second push-to-talk subscriber is not USSO-capable, delivering the presence information to the second push-to-talk subscriber using short message service (SMS).

9. A short message service (SMS) gateway for delivering presence information regarding push-to-talk subscribers in a manner that bypasses a short message service center (SMSC), the SMS gateway comprising:

(d) a short message point-to-point (SMPP) interface for receiving, from an SMPP or a presence server, presence information regarding a first push-to-talk subscriber, the presence information being destined for a second push-to-talk subscriber;

(e) an SS7 interface for delivering presence information to the second push-to-talk subscriber; and (f) a short message gateway function operatively associated with the SS7 and SMPP interface for delivering, using a short message service (SMS) message, the presence information to the second push-to-talk subscriber in a manner that bypasses an SMSC and a store and forward mechanism of SMS delivery implemented by the SMSC.

10. The SMS gateway of claim 9 wherein the short message gateway function is adapted to determine whether the second push-to-talk subscriber is available, in response to determining that the second push-to-talk subscriber is available, to deliver the presence information to the second push-to-talk subscriber in a manner that bypasses the SMSC.

11. The short message gateway of claim 10 wherein the short message gateway function is adapted to discard the presence information in response to determining that the second push-to-talk subscriber is not available.

12. The SMS gateway of claim 10 wherein the short message gateway function is adapted to notify the push-to-talk or presence server in response to determining that the second push-to-talk subscriber is not available.

13. The SMS gateway of claim 9 wherein the short message gateway function is adapted to query an HLR in order to determine the availability and location of the second push-to-talk subscriber.

14. A short message service (SMS) gateway for delivering presence information regarding push-to-talk subscribers in a manner that bypasses a short message service center (SMSC), the SMS gateway comprising:

(a) a short message point-to-point (SMPP) interface for receiving, from an SMPP or a presence server, presence information regarding a first push-to-talk subscriber, the presence information being destined for a second push-to-talk subscriber;

(b) an SS7 interface for delivering the presence information to the second push-to-talk subscriber; and (c) a short message gateway function operatively associated with the SS7 and SMPP interfaces for delivering the presence information to the second push-to-talk subscriber in a manner that bypasses an SMSC, comprising an unstructured supplementary services data (USSD) interface operatively associated with the short message gateway function, wherein the short message gateway function is adapted to determine whether the second push-to-talk subscriber is USSD-capable and, in response to determining that the second push-to-talk subscriber is USSD-capable, the short message gateway function is adapted to use the USSD interface to deliver the presence information to the second push-to-talk subscriber in response.

15. The SMS gateway of claim 14 wherein the short message gateway function is adapted to deliver the presence information to the second push-to-talk subscriber using SMS in response to determining that the second push-to-talk subscriber is not USSD-capable.

16. A computer program product for delivering presence information regarding push-to-talk subscribers, the computer program product comprising computer executable instructions embodied in a computer readable medium for performing steps comprising:

(g) receiving, from a push-to-talk or presence server, presence information regarding a first push-to-talk subscriber, the presence information being destined for a second push-to-talk subscriber;

(h) determining whether the second push-to-talk subscriber is available; and (i) in response to determining that the second push-to-talk subscriber is available, delivering, using a short message service (SMS) message, the presence information to the second push-to-talk subscriber in a manner that bypasses a short message service center (SMSC) and a store and forward mechanism of SMS delivery implemented by the SMSC.

17. The computer program product of claim 16 wherein receiving presence information includes receiving a short message peer-to-peer (SMPP) message containing presence information.

18. The computer program product of claim 16 wherein determining whether the second push-to-talk subscriber is available includes formulating a query to a home location register (HLR).

19. The computer program product of claim 16 wherein delivering the presence information to the second push-to-talk subscriber in a manner that bypasses the SMSC includes determining the location of the second push-to-talk subscriber and delivering the presence information via an SMS message to the second push-to-talk subscriber without sending the SMS message through the SMSC.

20. The computer program product of claim 16 comprising, in response to determining that the second push-to-talk subscriber is unavailable, discarding the presence information.

21. The computer program product of claim 16 comprising, in response to determining that the second push-to-talk subscriber is unavailable, notifying the presence or push-to-talk server that the second push-to-talk subscriber is unavailable.

22. A computer program product for delivering presence information regarding push-to-talk subscribers, the computer program product comprising computer executable instructions embodied in a computer readable medium for performing steps comprising:
  (a) receiving, from a push-to-talk or presence server, presence information regarding a first push-to-talk subscriber, the presence information being destined for a second push-to-talk subscriber;
  (b) determining whether the second push-to-talk subscriber is available; and
  (c) in response to determining that the second push-to-talk subscriber is available, delivering the presence information to the second push-to-talk subscriber in a manner that bypasses a short message service center (SMSC), wherein delivering the presence information includes determining whether the second push-to-talk subscriber is unstructured supplementary services data (USSD)- capable, and in response to determining that the second push-to-talk subscriber is USSD-capable, delivering the presence information to the second push-to-talk subscriber using USSD.

23. The computer program product of claim 22 wherein delivering the presence information to the second push-to-talk subscriber includes in response to determining that the second push-to-talk subscriber is not USSD-capable, delivering the presence information to the second push-to-talk subscriber using SMS.

24. A method for delivering presence information regarding push-to-talk subscribers in a manner that avoids latency introduced by short message service centers, the method comprising:
  (a) receiving a short message peer-to-peer (SMPP) message at an SMS gateway;
  (b) determining, using the SMS gateway, whether the message contains presence information for real time delivery; and
  (c) in response to determining that the message contains presence information for real time delivery and that a destination subscriber is available, delivering, using a short message service message, the presence information to the destination subscriber in a manner that bypasses a short message service center (SMSC) and a store and forward mechanism of SMS delivery implemented by the SMSC.

* * * * *